March 19, 1963 W. D. ROWE 3,082,368
MOTOR CONTROL APPARATUS
Filed April 7, 1960 2 Sheets-Sheet 1

WITNESSES:
Bernard R. Gieguey
James F. Young

INVENTOR
William D. Rowe
BY T. M. Brodahl
ATTORNEY

United States Patent Office 3,082,368
Patented Mar. 19, 1963

3,082,368
MOTOR CONTROL APPARATUS
William D. Rowe, Williamsville, N.Y., assignor to Westinghouse Electric Corporation, East Pittsburgh, Pa., a corporation of Pennsylvania
Filed Apr. 7, 1960, Ser. No. 20,714
10 Claims. (Cl. 318—467)

The present invention in general relates to motor control apparatus, and more particularly to control apparatus operative with the motor of a workpiece cutting device, such as a shear for cutting the moving strip resulting from the operation of a strip rolling mill.

It is an object of the present invention to provide improved control apparatus operative with a moving workpiece cutting device which control apparatus is made of of static components to minimize maintenance and repairs and more accurately measures the workpiece relative to at least one desired cut to be made and further more accurately determines the control of the motor for the cutting device relative to each of the one or more desired cuts to be made.

It is an additional object of the present invention to provide improved motor control apparatus for a workpiece cutting device that more accurately measures the movement of the workpiece and determines the necessary motor operation delay period relative to each desired cut to be made for providing a desired predetermined length of removed workpiece material relative to that cut in the workpiece.

It is a further object of the present invention to provide improved motor control apparatus for a workpiece cutting device which is better and more accurately operative to effect one or more predetermined desired cuts in a moving workpiece when the movement velocity of the workpiece may be unknown and further when the desired end length of workpiece to be cut from the main body of the workpiece is adjustable by an operator respecting successive cuts made by the workpiece cutting device.

These and other objects and advantages of the present invention will become apparent in view of the following description taken in conjunction with the drawings, wherein.

In the production of particularly hot steel strip it is sometimes desirable that one or perhaps both of the ends of a given piece of the strip be cut off due to the fact that they are often out of allowable thickness tolerances. In this regard it is desirable to be able to shear off with a crop shear or other workpiece cutting device this off-gauge material. The amount of material to be sheared off the end of a workpiece strip can be determined by either an operator or an automatic mechanism. The equipment disclosed here takes the signal which represents the amount of material to be sheared off at least one such end of the workpiece strip to the nearest inch regardless of the movement speed of the strip as long as the movement speed of the strip remains constant throughout the measurement and cutting calculation portions of the disclosed operation. The workpiece strip can move at a speed as high as 320 feet per minute if desired. A position sensing device such as a hot metal detector is used to detect the leading edge of the strip and an additional hot metal detector is co-operatively employed to measure the movement speed of the strip and actuate the crop shear at the correct time through the use of two digital counters; a reversible counter and a multiplier counter are used together to perform the disclosed operation. When the workpiece passes the first hot metal detector the reversible counter is started in its counting operation in a first direction at a predetermined frequency R. When the workpiece reaches the second hot metal detector the reversible counter stops its counting in this first direction and the count stored in the reversible counter divided by a predetermined number is transferred into the multiplier counter; also the reversible counter reverses its operation and starts counting in a second direction at a frequency of a predetermined fraction of R, such as R divided by 3. When the reversible counter reaches a count level predetermined by a suitable control signal the multiplier counter is started counting away from its stored count level. When the multiplier counter reaches a predetermined count, such as a zero count, the workpiece cutting device is caused to effect a cut in the workpiece. Either the leading end of the workpiece strip or the tail end of the workpiece strip may be cut off in this manner.

Figure 1:
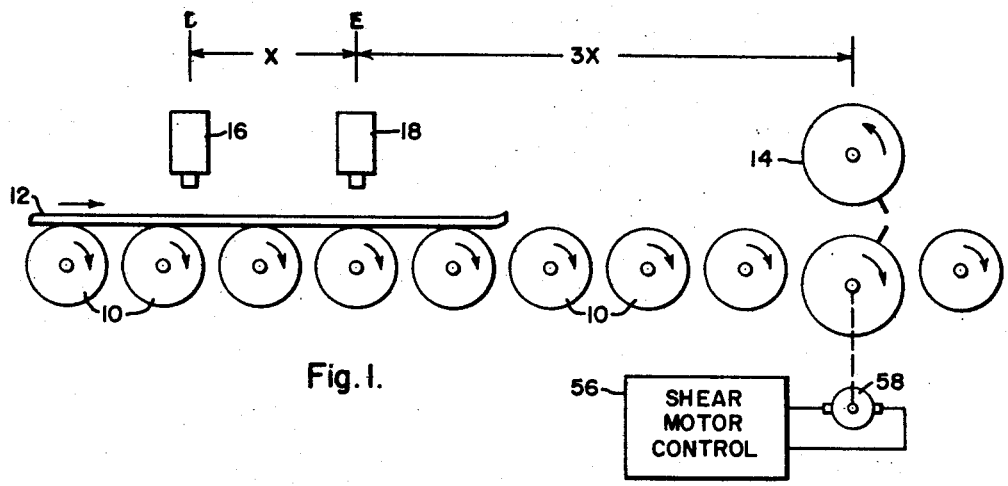
FIGURE 1 is a diagrammatic showing of a workpiece moving along a roller table toward a workpiece cutting device.

In FIGURE 1 there are shown multiple workpiece support rollers 10 operative to move a workpiece strip 12 in the direction indicated by the arrow toward a workpiece cutting device 14. A first position sensing device, such as a hot metal detector 16, initially senses the leading edge of the workpiece strip 12. A second position sensing device, such as a second hot metal detector 18, is located a predetermined distance away from the first position sensing device 16 and senses the leading end of the workpiece strip 12 after it has moved the distance between the workpiece position sensing devices 16 and 18. The cut position of the workpiece cutting device 14 would occur within a plane including the axes of rotation of the respective cutting roller members of the workpiece cutting device 14. This cutting position is located a predetermined distance away from the second workpiece position sensing device 18 in the direction of movement of the workpiece 12 that is related to the spacing between the workpiece sensing members 16 and 18. More specifically, if the space between the workpiece sensing members 16 and 18 is X, the distance between the cutting position of the workpiece cutting device 14 and the second workpiece position sensing device 18 may be 3X.

Figure 2:
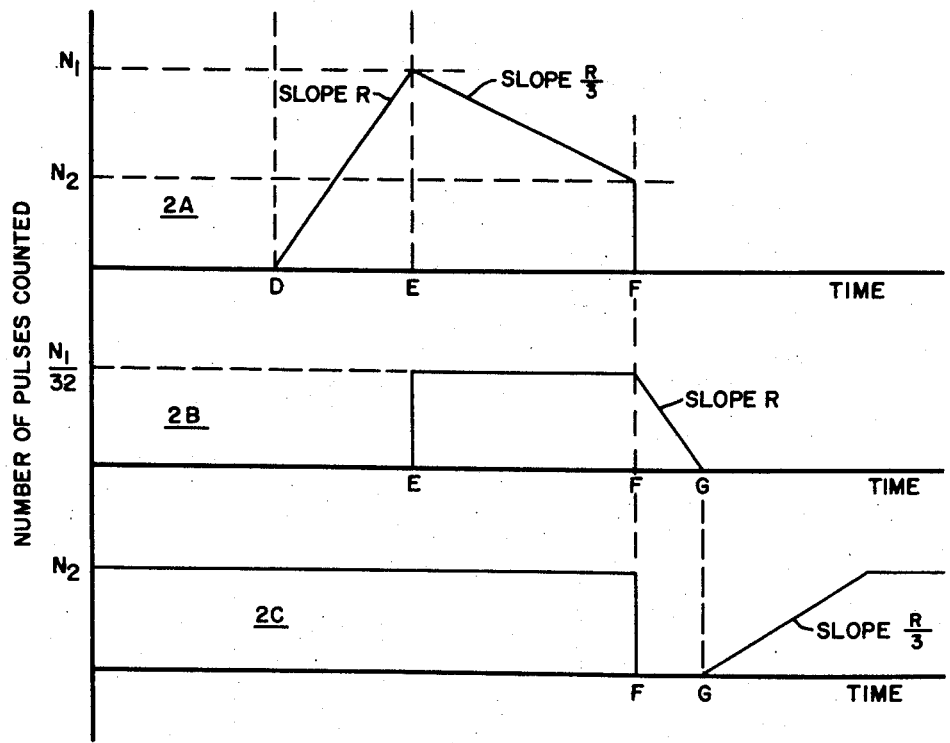
FIG. 2 is a curve chart illustrating the operation of the present motor control apparatus.

Relative to the curve chart as shown in FIG. 2, the curve 2A illustrates the counting operation of the provided reversible counter. More specifically, starting at a time corresponding to the operation of the first workpiece position sensing member 16, the reversible counter begins to count in a first direction, for example an upward direction, at a slope R corresponding to the reference frequency of the signal pulses from a reference oscillator. At a time E corresponding to the energization of the second workpiece position sensing member 18, the reversible counter reverses its operation and begins to count in a downward direction at a slope $R/3$ corresponding to a rate ⅓ the frequency of the signal pulses from the reference oscillator. The curve 2B illustrates the operation of the provided multiplier counter. The multiplier counter is operative such that at a time E, it receives a predetermined count M corresponding to a manual setting of the desired length of front end or tail end of the strip to be removed from the body of the strip. At the time F due to the operation of a provided comparator device the multiplier counter begins to count in a downward direction the signal pulses from the reference oscillator such that at a time G the count level reaches zero and causes the shear motor to operate the workpiece shear or cutting device. The curve 2C illustrates the operation of a provided calibration register which is initially provided with a calibration count of $N_2$ pulses, a predetermned number of signal pulses corresponding to the inertia of the operation of the workpiece cutting device. At a time F the count of the calibration register is compared and corresponds to the count of the reversible counter and causes a comparator to begin the downward count operation of the multiplier counter.

Figure 3:
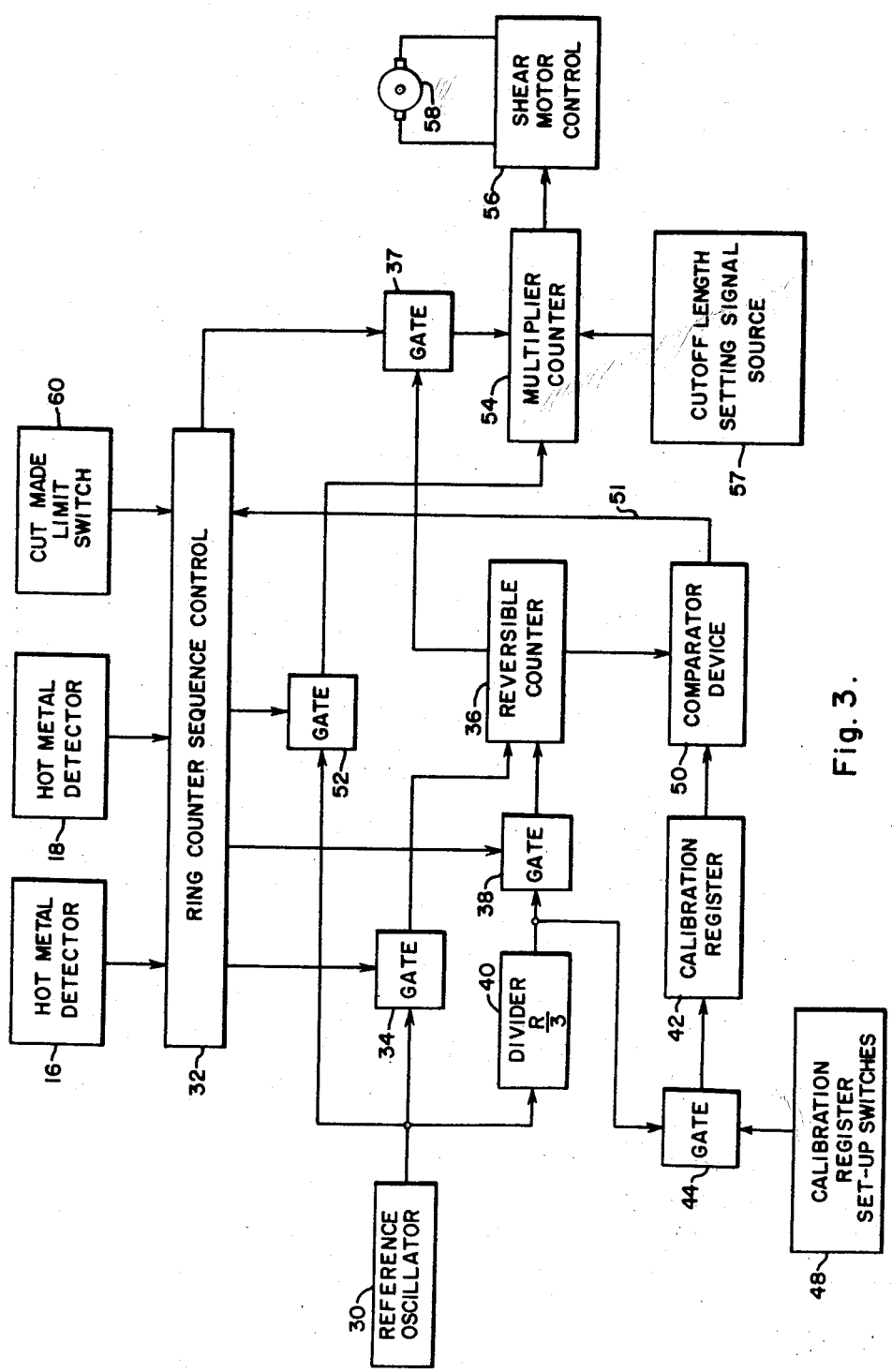
FIG. 3 is a diagrammatic showing of the motor control apparatus in accordance with the teachings of the present invention.

In FIG. 3 there is shown a schematic illustration of the motor control apparatus in accordance with the teachings of the present invention. The reference oscillator 30 is operative to provide signal pulses at a predetermined reference rate or number per minute. The first workpiece position sensing device 16, which is probably a hot metal detector, is operative with a well known ring counter sequence control 32 for providing a control signal to the signal gate 34 when the end of the workpiece 12 reaches a position corresponding to the location of the first workpiece position sensing device 16. The signal pulses from the reference oscillator are then supplied through the signal gate 34 to the reversible counter 36 for counting in an upward direction as shown by curve 2A of FIG. 2 and corresponding to the upward count at a slope R between the times D and E. When the leading end of the workpiece 12 reaches a position corresponding to the location of the second workpiece position sensing device 18, which again is probably a hot metal detector, the ring counter sequence control is operative to open the signal gate 38 and close the signal gate 34 such that the reversible counter 36 now begins counting in the reverse or downward direction of the signal pulses from the reference oscillator 30 as supplied through a divider 40, which effectively divides by the ratio of the distances X to 3X or by ⅓, such that the reversible counter receives signal pulses through the signal gate 38 at a rate ⅓ of the supply frequency of the signal pulses from the reference oscillator 30 and thereby the reversible counter 36 begins counting in a downward direction as illustrated in curve 2A of FIG. 2 between the times E and F.

A calibration register 42 is initially supplied with a number corresponding to the number of oscillator pulses ($R/3$) that occur during the time the shear takes to operate. This number is manually entered by the calibration register set up switches 48, through the operation of the gate 44. A comparator device 50 is operative to sense the count level number of the calibration register 42 and the count level of the reversible counter 36 such that when the count level of the reversible counter 36 corresponds substantially to the count level of the calibration register 42, the comparator device 50 provides a control signal to the ring counter sequence control 32 through the conductor 51 for opening the signal gate 52 and closing the signal gate 38 such that signal pulses from the reference oscillator 30 are now supplied through the signal gate 52 to the multiplier counter 54.

It should be noted that a manual cut-off length setting signal source 57 is operative to provide the multiplier counter 54 with a predetermined count level M corresponding to the desired length of end material to be removed from the workpiece 12. Thusly, when the signal gate 52 is opened the multiplier counter begins counting in a downward direction at a slope R corresponding to the frequency of the signal pulses from the reference oscillator 30 and as illustrated by curve 2B shown in FIG. 2. When the multiplier counter reaches a zero count level, the shear motor control 56 is energized and causes the motor 58 operative with the workpiece shear or cutting device 14 to effect the desired cut in the workpiece 12.

Since a predetermined and known distance X is provided between the first workpiece position sensing device 16 and the second workpiece position sensing device 18, there is provided means for determining the movement speed of the workpiece 12. The reference oscillator 30 supplies signal pulses at a known frequency and thusly a direct measure of the movement speed of the workpiece 12 is provided by the counting operation of the reversible counter 36 counting in an upward direction between the time intervals D and E as shown in curve 2A of FIG. 2. It should be further noted that when the end of workpiece 12 reaches the hot metal detector 16 the reversible counter 36 started counting in an upward direction at a constant rate R as shown in curve 2A of FIG. 2. The signal pulses counted by the reversible counter 36 were at a substantially constant frequency from the reference oscillator 30. When the leading edge of the workpiece 12 reached the second hot metal detector 18, the reversible counter 36 reversed its counting operation and began counting in a downward direction at a constant rate equal to the ratio between the respective distances X and 3X or ⅓ of the upward direction counting rate. This is also shown by curve 2A of FIG. 2. Since the ratio of the distance between the hot metal detector 16 and 18 as compared to the distance between the hot metal detector 18 and the workpiece cutting device 14 is 1:3, the count level of the reversible counter in the downward direction would reach zero when the leading edge of the workpiece 12 reached the workpiece cutting device 14 if it were desired that a cut of zero length be made.

However, to take into account the inherent time delay of the mechanical operation of the workpiece cutting device 14, the counting operation of the reversible counter 36 in the downward direction is stopped at a time F and at a count level $N_2$ greater than zero. The count level $N_2$ of the reversible counter 36 at the time F is predetermined from a knowledge of the known past history time delay of the workpiece cutting device 14 between an initial operation signal and the time that it finally effects a cut in the workpiece. Since a known constant run function may be used to drive the workpiece cutting device this time delay is substantially constant and may be predetermined in advance of a particular operation of the workpiece cutting device. As a practical matter, this required time delay period may be represented by a digital number equivalent to the number of signal pulses from the reference counter 30 supplied through the signal gate 38 to the reversible counter 36 at a rate $R/3$ that would occur in this time delay interval. Then when the count level of the reversible counter 36 is equivalent to this predetermined number of signal pulses, which is the illustrated count level $N_2$ and may be entered by the control of gate 44 as shown in FIG. 3, the operational function of the workpiece cutting device 14 may be initiated. The output signal level of the reversible counter 36 and the manual setup count level $N_2$ of the calibration register 42 are in effect compared by the comparator device 50 as the reversible counter counts down in its operation between the time periods E and F shown by the curve 2A of FIG. 2. When the reversible counter reaches the count level $N_2$ at the time F, the comparator device 50 is operative to provide the output control signal through conductor 51 to the ring counter sequence control 32. In this regard the gate 44 is operative to initially provide the time delay count level $N_2$ in the calibration register 42, and it is this time delay count level $N_2$ from the calibration register 42 which is compared to the count level in the reversible counter 36 and is operative in the comparator device 50 at the time F to provide the output control signal to the ring counter sequence control 32. Thusly, if it were desired to effect a zero length cut in the workpiece 12, the latter output control signal from the comparator device 50 to the ring counter sequence control 32 would be operative in this regard.

The problem now remains to generate an additional time delay such that the desired length of end material will be removed from the workpiece 12. This is accomplished by the multiplier counter 54 which is per se a well known counter device. The count level $N_1$ in the reversible counter 36 at the time it reverses as shown by the time E in curve 2A of FIG. 2 is proportional to the reciprocal of the velocity of the workpiece 12 along the workpath. It is the number of signal pulses generated by the reference oscillator 30 at a frequency R during the time period between the times D and E that it takes the leading edge of the workpiece 12 to move the predetermined distance between the hot metal detector 16 and the hot metal detector 18. Thus, for example, if this distance is 32 inches, the count level in the reversible counter at the time E corresponds to $$N_1 = \frac{32 \times R}{V}$$

where V is the velocity of the workpiece 12 in inches per second. If we divide $N_1$ by 32 we will have the reciprocal of the velocity expressed in pulses per inch. If we multiply this by number of inches we wish to cut we will have the desired time delay in terms of pulses of frequency R.

The computations of the previous paragraph are accomplished as follows: At the time E when the reversible counter 36 reverses the count at a count level $N_1$, the count $N_1$ is sent into the multiplier counter through the signal gate 37 except for the five least significant bits. This is illustrated by the curve 2B of FIG. 2. The effect of leaving off the five least significant bits is to divide the number $N_1$ by $2^5$ or 32. The other input, M, to the multiplier counter is manually set at the desired cut length in inches and is determined by the manual setting count level M of the signal source 57.

When the count $N_2$ in the reversible counter 36 matches the similar count in the calibration register 42, the comparator device 50 causes the ring counter sequence control 32 to open the signal gate 52 and thereby cause the multiplier counter 54 to count down at a rate R the signal pulses from the reference oscillator 32 by counting through $N_1/32$ pulses for each pulse value of the count level M as well known in this art until a zero count is provided in the multiplier counter 54. In this manner a time delay equal to the product of the number of pulses per inch as represented by the count $N_1/32$ and the number of inches that it is desired to cut off the workpiece 12 as represented by the count M is provided. The control signal to the shear is then given by the multiplier counter 54 and the correct cut is made in the workpiece 12.

The cut made limit switch 60 may be employed to again cycle the ring counter sequence control 32 for controlling the present motor control apparatus for the next succeeding cut to be made if desired.

Although the present invention has been described with a certain degree of particularity, it should be understood that the present disclosure has been made only by way of example and that numerous changes in the details of construction and the combination and arrangements of parts may be resorted to without departing from the scope and spirit of the present invention.

I claim as my invention:

1. In control apparatus for a cutting device operative with a workpiece traveling along a workpath, the combination of a pulse signal source, a first sensing device operative with said workpiece for providing a first control signal when the workpiece is at a first location in said workpath, a second sensing device operative with said workpiece for providing a second control signal when the workpiece is at a second location in said workpath, a reversible pulse signal counter operative with said pulse signal source and responsive to said first control signal and to said second control signal to count in a first direction the pulse signals from said pulse signal source for the time duration between said first and second control signals, said pulse signal counter being responsive to the second control signal to count in a second direction said pulse signals, with said pulse signal counter being operative with said cutting device to effect a cut in said workpiece when the resulting count of said pulse signal counter reaches a predetermined level.

2. In control apparatus for a cutting device operative with a workpiece traveling along a workpath, the combination of a pulse signal source, a first sensing device operative with said workpiece for providing a first control signal when the workpiece is at a first location in said workpath, a second sensing device operative with said workpiece for providing a second control signal when the workpiece is at a second location in said workpath, a reversible pulse signal counter operative with said pulse signal source and responsive to said first control signal and to said second control signal to count in a first direction the pulse signals from said pulse signal source for a time duration in accordance with the distance between said first and second locations in said workpath, said pulse counter being responsive to the second control signal to count in a second direction said pulse signals, with said pulse counter being operative with said cutting device to effect a cut in said workpiece when the resulting count of said pulse counter reaches a predetermined level.

3. In control apparatus for a predetermined function device operative with a workpiece traveling along a workpath, the combination of a pulse signal source, a first sensing device operative with said workpiece for providing a first control signal when the workpiece is at a first location in said workpath, a second sensing device operative with said workpiece for providing a second control signal when the workpiece is at a second location in said workpath, a pulse signal counter operative with said pulse signal source and responsive to said first control signal to count at a first rate the pulse signals from said pulse signal source, said pulse counter being responsive to the second control signal to count at a different rate said pulse signals, with said pulse counter being operative with said predetermined function device to initiate said predetermined function relative to said workpiece when the resulting count of said pulse counter reaches a predetermined level.

4. In control apparatus for a cutting device operative with a workpiece traveling along a workpath, the combination of a pulse signal source, a first sensing device operative with said workpiece for providing a first control signal when the workpiece is at a first location in said workpath, a second sensing device operative with said workpiece for providing a second control signal when the workpiece is at a second location in said workpath, a reversible pulse signal counter operative with said pulse signal source and responsive to said first control signal to count in a first direction at a first rate the pulse signals from said pulse signal source, said pulse counter being responsive ot the second control signal to count in a second direction and at a different rate said pulse signals, with said pulse counter being operative with said cutting device to effect a cut in said workpiece when the resulting count of said pulse counter reaches a predetermined level.

5. In control apparatus for a cutting device operative with a workpiece traveling along a workpath, the combination of a pulse signal source, a first sensing device operative with said workpiece for providing a first control signal when the workpiece is at a first location in said workpath, a second sensing device operative with said workpiece for providing a second control signal when the workpiece is at a second location in said workpath, with said first location being at a predetermined distance from said second location, a pulse signal counter operative with said pulse signal source and responsive to said first control signal to start the count in a first manner of the pulse signals from said pulse signal source, said pulse counter being responsive to the second control signal to stop the count in said first manner and start the count in a second manner of said pulse signals, with said pulse counter being operative with said cutting device when counting in said second manner to effect a cut in said workpiece when the resulting count of said pulse counter reaches a predetermined level.

6. In control apparatus for a cutting device operative with a workpiece traveling along a workpath, the combination of a pulse signal source, a first sensing device operative with said workpiece for providing a first control signal when the workpiece is at a first location in said workpath, a second sensing device operative with said workpiece for providing a second control signal when the workpiece is at a second location in said workpath, with said first location being at a predetermined distance from said second location, a reversible pulse signal counter operative with said pulse signal source and responsive to said first control signal to start the count in a first direction of the pulse signals from said pulse signal source, said pulse counter being responsive to the second control signal to stop the count in said first direction and start the count in a second direction of said pulse signals, with said pulse counter being operative with said cutting device when counting in said second direction to effect a cut in said workpiece when the resulting count of said pulse counter reaches a predetermined level.

7. In control apparatus for a cutting device operative with a workpiece traveling along a workpath, the combination of a first pulse signal source, a first sensing device operative with said workpiece for providing a first control signal when the workpiece is at a first location in said workpath, a second sensing device operative with said workpiece for providing a second control signal when the workpiece is at a second location in said workpath, a pulse signal counter operative with said first pulse signal source and responsive to said first control signal to count in a first manner the pulse signals from said first pulse signal source, said pulse counter being responsive to the second control signal to count in a second manner the latter said pulse signals, a second pulse signal source, a signal comparison device operative with said pulse signal counter and said second pulse signal source for providing a third control signal when the signal count for the pulse counter reaches a level in accordance with a predetermined number of pulse signals from the second pulse signal source, with the comparison device being operable with said cutting device for effecting a cut in said workpiece in response to the third control signal.

8. In control apparatus for a cutting device operative with a workpiece traveling along a workpath, the combination of a first pulse signal source, a first sensing device operative with said workpiece for providing a first control signal when the workpiece is at a first location in said workpath, a second sensing device operative with said workpiece for providing a second control signal when the workpiece is at a second location in said workpath, a reversible pulse signal counter operative with said first pulse signal source and responsive to said first control signal to count in a first direction the pulse signals from said first pulse signal source, said pulse counter being responsive to the second control signal to count in a second direction the latter said pulse signals, a second pulse signal source, a signal comparison device operative with said reversible counter and said second pulse signal source for providing a third control signal when the signal count of the pulse counter reaches a level in accordance with a predetermined number of pulse signals from the second pulse signal source, with the comparison device being operable with said cutting device for effecting a cut in said workpiece in response to the third control signal.

9. In control apparatus for a cutting device operative with a workpiece traveling along a workpath, the combination of a pulse signal source, a first sensing device operative with said workpiece for providing a first control signal when the workpiece is at a first location in said workpath, a second sensing device operative with said workpiece for providing a second control signal when the work piece is at a second location in said workpath, a pulse signal counter operative with said pulse signal source and responsive to said first control signal and said second control signal to count at a first rate for a predetermined time period the pulse signals from said pulse signal source, said pulse counter being responsive to the second control signal to count at a second rate said pulse signals, a signal sensing device operative with said reversible counter for providing a third control signal when the resulting signal count of the pulse counter reaches a predetermined level, and a second pulse signal counter operative with said pulse signal source and responsive to said third control signal for counting a predetermined number of said pulse signals, with said second counter being operable with said cutting device for effecting a cut in said workpiece after counting said predetermined number of pulse signals.

10. In control apparatus for a cutting device operative with a workpiece traveling along a workpath, the combination of a pulse signal source, a first sensing device operative with said workpiece for providing a first control signal when the workpiece is at a first location in said workpath, a second sensing device operative with said worpiece for providing a second control signal when the workpiece is at a second location in said workpath, a reversible pulse signal counter operative with said pulse signal source and responsive to said first control signal and said second control signal to count in a first direction for a predetermined time period the pulse signals from said pulse signal source, said pulse counter being responsive to the second control signal to count in a second direction said pulse signals, a signal sensing device operative with said reversible counter for providing a third control signal when the signal count of the pulse counter reaches a predetermined level, and a second pulse signal counter operative with said pulse signal source and responsive to said third control signal for counting a predetermined number of said pulse signals, with said second counter being operable with said cutting device for effecting a cut in said workpiece after counting said predetermined number of pulse signals.

References Cited in the file of this patent
UNITED STATES PATENTS
2,655,994     Vandenberg  ------------- Oct. 20, 1953